United States Patent
Koizumi et al.

(10) Patent No.: US 9,712,946 B2
(45) Date of Patent: Jul. 18, 2017

(54) INFORMATION-GATHERING SYSTEM, SENSOR TERMINAL, COMMUNICATION TERMINAL AND TERMINAL CONNECTION CONTROL METHOD

(71) Applicant: HITACHI, LTD., Tokyo (JP)

(72) Inventors: Kazuto Koizumi, Tokyo (JP); Tomoichi Yamagishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 14/517,958

(22) Filed: Oct. 20, 2014

(65) Prior Publication Data
US 2015/0117457 A1  Apr. 30, 2015

(30) Foreign Application Priority Data
Oct. 25, 2013  (JP) .................................. 2013-221747

(51) Int. Cl.
| | |
|---|---|
| *H04W 4/00* | (2009.01) |
| *H04W 76/00* | (2009.01) |
| *H04L 1/00* | (2006.01) |
| *H04W 24/00* | (2009.01) |

(Continued)

(52) U.S. Cl.
CPC ............... *H04W 4/006* (2013.01); *H04L 1/00* (2013.01); *H04W 4/003* (2013.01); *H04W 4/005* (2013.01); *H04W 24/00* (2013.01); *H04W 48/00* (2013.01); *H04W 76/00* (2013.01); *H04L 45/42* (2013.01)

(58) Field of Classification Search
CPC ....... H04L 67/12; H04L 63/08; H04L 67/125; H04W 4/005–4/006
See application file for complete search history.

(56) References Cited

U.S. PATENT DOCUMENTS

| | | | | |
|---|---|---|---|---|
| 8,880,662 B1 * | 11/2014 | Martin | ................ | H04L 41/0806 709/221 |
| 2002/0013831 A1 * | 1/2002 | Astala | ..................... | H04L 63/08 709/220 |

(Continued)

FOREIGN PATENT DOCUMENTS

| | | |
|---|---|---|
| JP | 2002-334012 A | 11/2002 |
| JP | 2003-122654 A | 4/2003 |

(Continued)

*Primary Examiner* — Jeffrey M Rutkowski
*Assistant Examiner* — Fangyan Deng
(74) *Attorney, Agent, or Firm* — Mattingly & Malur, PC

(57) ABSTRACT

In a terminal connection control method for a system having a plurality of centers, the plurality of centers include a first center for initial connection and a plurality of second centers, the first center includes information of the plurality of second centers, destination information of the first center and information of a terminal are previously stored in the terminal, when the terminal requires the system for connection, the terminal requires the first center for connection based on the destination information of the first center, and sends the terminal information to the first center, the first center selects, from the plurality of second centers, a destination of the terminal which sends connection requirement based on information received from the terminal and based on information of the second centers, and the first center sends the destination information of the selected second center to the terminal which sends the connection requirement.

7 Claims, 19 Drawing Sheets

(51) Int. Cl.
*H04W 48/00* (2009.01)
*H04L 12/717* (2013.01)

(56) References Cited

U.S. PATENT DOCUMENTS

| | | | | |
|---|---|---|---|---|
| 2002/0095516 A1* | 7/2002 | Nada | ............... | H04L 29/06027 |
| | | | | 709/245 |
| 2003/0053430 A1* | 3/2003 | Choi | ............... | H04W 36/12 |
| | | | | 370/331 |
| 2006/0209844 A1* | 9/2006 | Carpenter | .......... | G06Q 30/0283 |
| | | | | 370/395.52 |
| 2008/0152104 A1* | 6/2008 | Keeler | ................ | H04W 24/04 |
| | | | | 379/112.01 |
| 2009/0262701 A1* | 10/2009 | Motegi | ................ | H04W 36/02 |
| | | | | 370/331 |
| 2012/0287854 A1* | 11/2012 | Xie | ..................... | H04W 48/08 |
| | | | | 370/328 |
| 2013/0083753 A1* | 4/2013 | Lee | .................. | H04W 72/0453 |
| | | | | 370/329 |
| 2013/0084905 A1* | 4/2013 | Ehara | ................... | H04W 4/005 |
| | | | | 455/500 |
| 2014/0228061 A1* | 8/2014 | Draznin | ................. | H04W 4/12 |
| | | | | 455/466 |

FOREIGN PATENT DOCUMENTS

| | | |
|---|---|---|
| JP | 2007-019779 A | 1/2007 |
| JP | 2008-136058 A | 6/2008 |
| JP | 2008-263445 A | 10/2008 |
| JP | 2013-062805 A | 4/2013 |
| JP | 2013-187656 A | 9/2013 |
| WO | WO 00/33536 A1 | 6/2000 |

* cited by examiner

FIG. 5

| COMMUNICATION TERMINAL ID ⌇581 | CARRIER NAME ⌇582 | KIND OF CONTRACT ⌇583 | PACKET UNIT PRICE ⌇584 | USING STATUS ⌇585 | REMAINING AMOUNT OF THIS MONTH ⌇586 |
|---|---|---|---|---|---|
| XXX1 | COMPANY A | PAY-AS-YOU-GO | xx YEN | xxx PACKET | X PACKET |
| YYY1 | COMPANY B | FIXED PAYMENT | yy YEN | yyy PACKET | Y PACKET |
| .. | .. | .. | .. | .. | .. |

| TERMINAL ID 661 | KIND OF TERMINAL 662 | INSTALLATION PLACE 663 | DESTINATION DCC CENTER 664 | WIRELESS SECTION RADIO FIELD STRENGTH 665 | DESTINATION COMMUNICATION TERMINAL 666 | OPERATION TIME 667 | COMMUNICATION STABILITY 668 | RESPONSE TIME 669 |
|---|---|---|---|---|---|---|---|---|
| XXX1 | COMMUNICATION TERMINAL | PPPP | DCC CENTER A | tt db | — | aaa HOURS | AA% | K SECONDS |
| YYY1 | COMMUNICATION TERMINAL | QQQQ | DCC CENTER B | uu db | — | bbb HOURS | BB% | L SECONDS |
| xxx1 | SENSOR TERMINAL | RRRR | DCC CENTER A | vv db | XXX1 | ccc HOURS | CC% | M SECONDS |
| yyy1 | SENSOR TERMINAL | SSSS | DCC CENTER B | ww db | YYY1 | ddd HOURS | DD% | N SECONDS |
| .. | .. | .. | .. | | | .. | .. | |

| CENTER 681 | CONTRACTED LINE BAND 682 | LINE AVERAGE TRAFFIC 683 | LINE PEAK TRAFFIC 684 | SERVER RESOURCE STATUS (CPU, MEMORY, DISK) 685 | MAINTENANCE 686 |
|---|---|---|---|---|---|
| DCC CENTER A | aaaMbps | AAMbps | XXMbps | xx% | YYYY.MM.DD hh:mm TO HH:MM |
| DCC CENTER B | bbbMbps | BBMbps | YYMbps | yy% | — |
| DCC CENTER C | cccMbps | CCMbps | ZZMbps | zz% | — |
| .. | .. | .. | .. | .. | |

| USER | POSSESSED COMMUNICATION TERMINAL ID | POSSESSED SENSOR TERMINAL ID | DATA ACQUISITION CYCLE | KINDS OF DATA | DCC CENTER PREPARATION STATUS |
|---|---|---|---|---|---|
| AAAAA | XXX1, XXX2, ... | xxx1, xxx2, ... | ONCE/3 HOURS | aaaa | DCC CENTER A: OPERATING, DCC CENTER B: NOT YET OPERATING |
| BBBBB | YYY1, YYY2, ... | yyy1, yyy2, ... | ONCE/30 MINUTES | bbbb | DCC CENTER A: OPERATING, DCC CENTER B: OPERATING |
| CCCCC | ZZZ1, ZZZ2, ... | zzz1, zzz2, ... | NON-REGULAR | cccc | DCC CENTER A: NOT YET OPERATING, DCC CENTER B: OPERATING |
| .. | .. | .. | .. | .. | |

INFORMATION-GATHERING SYSTEM, SENSOR TERMINAL, COMMUNICATION TERMINAL AND TERMINAL CONNECTION CONTROL METHOD

CROSS-REFERENCE TO RELATED APPLICATION

This application claims the priority of Japanese Patent Application No. 2013-221747 filed Oct. 25, 2013, which is incorporated herein by reference in its entirety.

BACKGROUND OF THE INVENTION

1. Field of the Invention

The present invention relates to a communication terminal, and communication control between the communication terminal and a center.

2. Description of the Related Art

In recent years, with widespread of a cloud technique, a system having a plurality of centers to which a terminal can connect without realizing a destination for receiving services is being developed. Even in such a cloud-based system, if this system is of a communication business operator for example, it is necessary to take constraint of physical resources (network resource and CPU resource) of a center and a communication path into account when the center and the communication path to which the terminal connects are determined. JP-2013-187656-A discloses a technique in which physical resources (network resource and CPU resource) of network of a cloud of an object of management is monitored, and if the physical resources exceed a permissible using rate, topology information in which the physical resources and communication paths are associated with each other is referred to, paths from which paths exceeding the permissible using rate are eliminated are calculated, and information of paths through which communication should be disconnected is sent out.

SUMMARY OF THE INVENTION

An M2M (Machine-to-Machine) system is also getting larger and further depending on cloud, various kinds of sensors of various business types are accommodating in the same system, and there is increased need to gather a large quantity of information. A role of the M2M system is changed from mere collecting of sensor information to a mission-critical role which requires real time and high precision information collecting such as a land slide sensor of a slope and a water quantity sensor of a river, and it is not permitted to disconnect communication disorderly.

If a scale of the entire system becomes large, an operation for setting management information for managing terminals in sensor terminals and various kinds of communication terminals which relay information from the sensor terminals, and an operation for installing these terminals become complicated. Further, it becomes necessary to manage the gathered sensor information based on possessing users (e.g., electric power company), based on installation places of the sensor terminals and communication terminals, or based on sensor information. In the case of a small-scale system having a small amount of sensor terminals and communication terminals, it is possible to previously set management information based on the terminals, but in the case of a large amount of terminals, it is a complicated operation to individually set the management information for each of the terminals, and the number of operation steps is increased. When an operation is required when terminals are installed on site also, the installation operation becomes complicated, and the number of operation steps is increased. Hence, a configuration capable of automatically connecting to a system even if information is not previously set in the sensors or the various kinds of communication terminals is desired.

Further, in the M2M system, the sensor terminals and the communication terminals require not only function for collecting simple sensor information after the sensor terminals and communication terminals are installed, but in some cases also function for downloading firmware and new management information from a center for the sensor terminals and the communication terminals to provide new service. When download of the firmware and management information is considered, in the conventional M2M system, many contracts of public line and pay-as-you-go are established between the center and communication terminals, and expensive communication costs are generated every time.

The present invention has been accomplished to solve the above problems, and it is an object of the invention to provide a terminal capable of automatically connecting to a system without requiring individual previous setting. It is also an object of the invention to select communication paths and destination centers in accordance with a state of the terminal, to reduce communication costs, and to prevent communication packet from being lost due to concentration of communication. It is also an object of the invention to avoid unnecessary communication disconnection.

To solve the above problems, in the present invention, a system is provided therein with an initial connecting first center and a plurality of second centers, the first center includes information of the plurality of second centers, destination information of the first center and information of a terminal are previously stored in the terminal, when the terminal requires the system for connection, the terminal requires the first center for connection based on the destination information of the first center, and sends the terminal information to the first center, the first center selects, from the plurality of second centers, a destination of the terminal which sends connection requirement based on information received from the terminal and based on information of the second centers, and the first center sends the destination information of the selected second center to the terminal which sends the connection requirement.

According to the present invention, it is possible to provide a sensor terminal and a communication device capable of automatically connecting to an M2M system without requiring individual previous setting. It is also possible to select communication paths and connection destination centers in accordance with a state of the sensor terminal and the communication device, to reduce communication costs, and to prevent communication packet from being lost due to concentration of communication. It is also possible to avoid unnecessary communication disconnection.

BRIEF DESCRIPTION OF THE DRAWINGS

FIG. 5 is a diagram showing one example of a public line cost information data table possessed by the route information managing server of the INIT center;

FIG. 7 is a diagram showing one example of a terminal operation information data table possessed by the entire operation managing server of the INIT center;

FIG. 8 is a diagram showing one example of a DCC center operation information data table possessed by the entire operation managing server of the INIT center;

FIG. 10 is a diagram showing one example of a user information data table possessed by a user information managing server in the INIT center;

DESCRIPTION OF THE PREFERRED EMBODIMENT

An embodiment of the present invention will be described below.

Figure 1:
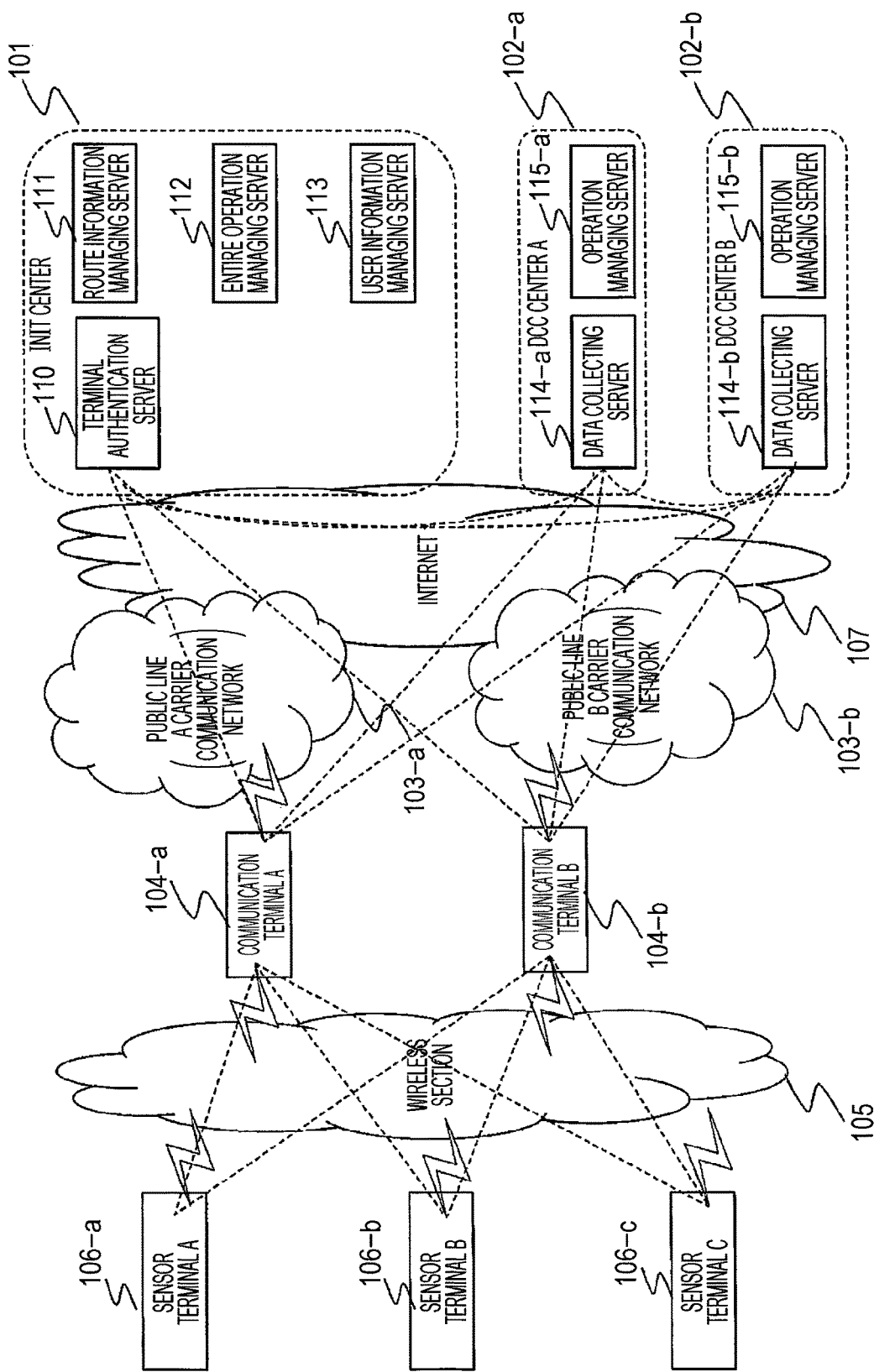
FIG. 1 is a diagram for describing a configuration of an M2M system in an embodiment of the present invention.

FIG. 1 is a diagram for describing a configuration of an M2M system in the embodiment of the invention.

FIG. 1 shows an example of a system in which a plurality of centers and communication terminals are connected to one another through any of a plurality of public lines (carrier communication networks), and the communication terminals and sensor terminals are connected to one another through wireless line. The communication terminals and the sensor terminals are integrally configured in some cases.

In the example shown in FIG. 1, three sensor terminals and two communication terminals can be in communication with each other in a wireless section 105. Sensor terminals 106-a to 106-c can be connected to any of communication terminals 104-a to 104-b through the wireless section 105.

The communication terminals 104-a to 104-b are connected to a center through any of communication networks (A carrier communication networks, B carrier communication networks) 103-a to 103-b of a plurality of communication carries via an Internet 107. The M2M system of the embodiment includes the center (Initial center: INIT center hereinafter) to which the communication terminals and the sensor terminals connect when they initially connect to the system, and a plurality of information collecting centers (Data Collect & Control centers: DCC centers hereinafter) allocated as destinations of terminals by the INIT center after the communication terminals and the sensor terminals initially connect to the INIT center and authentication processing is carried out by the INIT center. The INIT center 101 and the DCC centers 102-a to 102-b can data-communicate with each other via the Internet 107. The INIT center and the DCC centers liaise with each other in terms of necessary data such as an operation state of the communication terminals and the sensor terminals and an operation state of the centers.

The sensor terminals 106-a to 106-c can communicate with the INIT center 101 and the DCC centers 102-a to 102-b through the wireless section by the wireless communication via the communication terminals 104-a to 104-b. Communication networks between the sensor terminals 106-a to 106-c and the communication terminals 104-a to 104-b are mesh configurations, and communication networks between the communication terminals 104-a to 104-b and the DCC centers 102-a to 102-b are also mesh configurations. Connections of the sensor terminals 106-a to 106-c with respect to which of the DCC centers 102-a to 102-b via which of the communication terminals 104-a to 104-b are automatically determined as will be described in the following embodiment.

In this embodiment, the communication terminal and the sensor terminal store, in non-volatile memories at the time of factory shipment, communication path information (static route information, e.g., destination address information of INIT center) which is necessary to connect to the INIT center. First, the communication terminal and the sensor terminal connect to the INIT center and carry out terminal authentication. Thereafter, the INIT center determines a destination DCC centers and communication paths of the communication terminal and the sensor terminal, and sends, to the communication terminal and the sensor terminal, information which is necessary to connect to the DCC center. Further, the communication terminal is notified of sensor terminal information from DCC center.

The communication terminal or the sensor terminal first connects to the INIT center when it initially connects to the M2M system and terminal authentication processing is carried out and then, the INIT center determines destination DCC centers and communication paths of the sensor terminal and the communication terminal, the sensor terminal and the communication terminal receive information which is necessary to connect to the DCC center from the INIT center, and connect to the DCC center so that the DCC center can receive sensor information. In this embodiment, this situation is described as entry into network in some cases.

The INIT center 101 includes an authentication server 110 which carries out authentication processing which is necessary for the communication terminal and the sensor terminal to enter the network. One example of the authentication method is to utilize an identifier for identifying individuals such as MAC addresses possessed by respective terminals.

Figure 2:
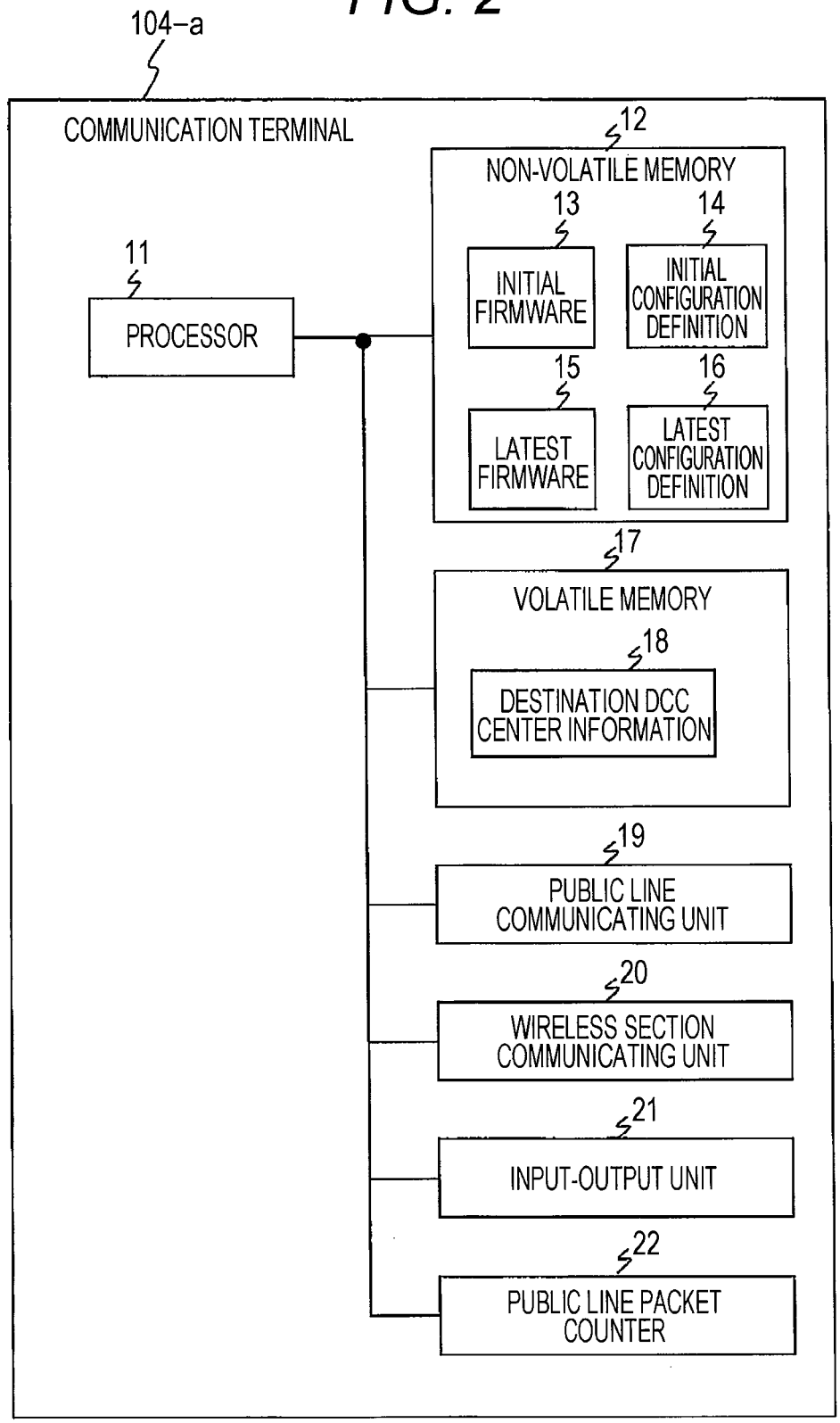
FIG. 2 is a block diagram for describing a configuration of a communication terminal in the embodiment of the invention.

FIG. 2 is a block diagram for describing a configuration of the communication terminal in the embodiment of the invention.

FIG. 2 is a block diagram showing one example of the communication terminal 104-*a*. Since the communication terminal 104-*b* has the same configuration as that of the communication terminal 104-*a*, description of the communication terminal 104-*b* will be omitted.

The communication terminal 104-*a* includes: a processor 11 which carries out computation; a non-volatile memory 12 for storing an initial firmware 13, an initial configuration definition 14, a latest firmware 15, a latest configuration definition 16 and other data and programs; an input-output unit 21 which inputs and displays screens from a destination DCC center information 18 notified from the INIT center, a volatile memory 17 which temporarily stores other data and programs, a public line communicating unit 19 which communicates with the A carrier communication network 103-*a*, a wireless section communicating unit 20 which communicates with the wireless section 105, and a user; and a public line packet counter 22 having function to count communication packets which are sent and received by the public line communicating unit 19. The public line communicating unit 19 or the wireless section communicating unit 20 includes a GPS in terms of hardware in some cases.

The processor 11 operates in accordance with programs of the various function units, thereby operating as function unit which realizes predetermined function. For example, the processor 11 operates in accordance with the latest firmware 15 and the latest configuration definition 16 which is setting information of the latest firmware 15. The initial firmware and other programs are also the same. The processor 11 also operates as function unit for realizing a plurality of processing sets executed by the respective programs.

One example of the non-volatile memory 12 is a non-temporarily data storage medium capable of reading a calculator such as a non-volatile semiconductor, a hard disk drive, a storage device such as an SSD (Solid State Drive), an IC card, an SD card and a DVD.

The wireless section communicating unit 20 of the communication terminal 104-*a* connects to a sensor terminal A to a sensor terminal C (106-*a* to 106-*c*) through wireless line via the wireless section 105. Communication using an INIT center connection communication ID of the wireless section communicating unit 20 is subjected to gateway if necessary, the communication is connected to the INIT center 101 through the public line communicating unit 19, and communication using the a DCC center connection communication ID is similarly connected to the DCC centers 102-*a* to 102-*b* through the public line communicating unit 19.

A wireless section communication INIT center connection communication ID and an INIT center connection identifier (IP address and domain name) are written in the initial configuration definition 14 and the latest configuration definition 16 in the non-volatile memory 12, but a wireless section communication DCC center connection communication ID and a DCC center connection identifier are not written. The destination DCC center information 18 of the volatile memory 17 is authenticated in the INIT center and then, the destination DCC center information 18 is delivered from the INIT center, and the DCC center connection communication ID and the DCC center connection identifier (IP address and domain name) are written. These information sets are stored in the volatile memory. According to this, there is an effect that even if the communication terminal is stolen and a program therein is analyzed, since the information concerning the DCC center is eliminated by turning power OFF, and security is enhanced.

The public line packet counter 22 has function to count the communication packets of the public line communicating unit 19, notifies a DCC center to be connected of the count value if necessary, or reply to query from the DCC center. The count value of the communication packets sent from the communication terminal 104-*a* is once accumulated in a communication terminal-based communication packet managing unit 99 (this will be described later using FIG. 12) of the operation managing server 115-*a* in the DCC center to be connected, and the count value is registered in a public line cost information data table 58 (this will be described later using FIG. 5) of a route information managing server 111 in the INIT center 101. The route information managing server 111 determines a using amount of the current month from the count value, calculates remaining communication packets which can be used based on pay-as-you-go, and gives the information to the network entering route managing unit 56 (this will be described later using FIG. 4).

Figure 3:
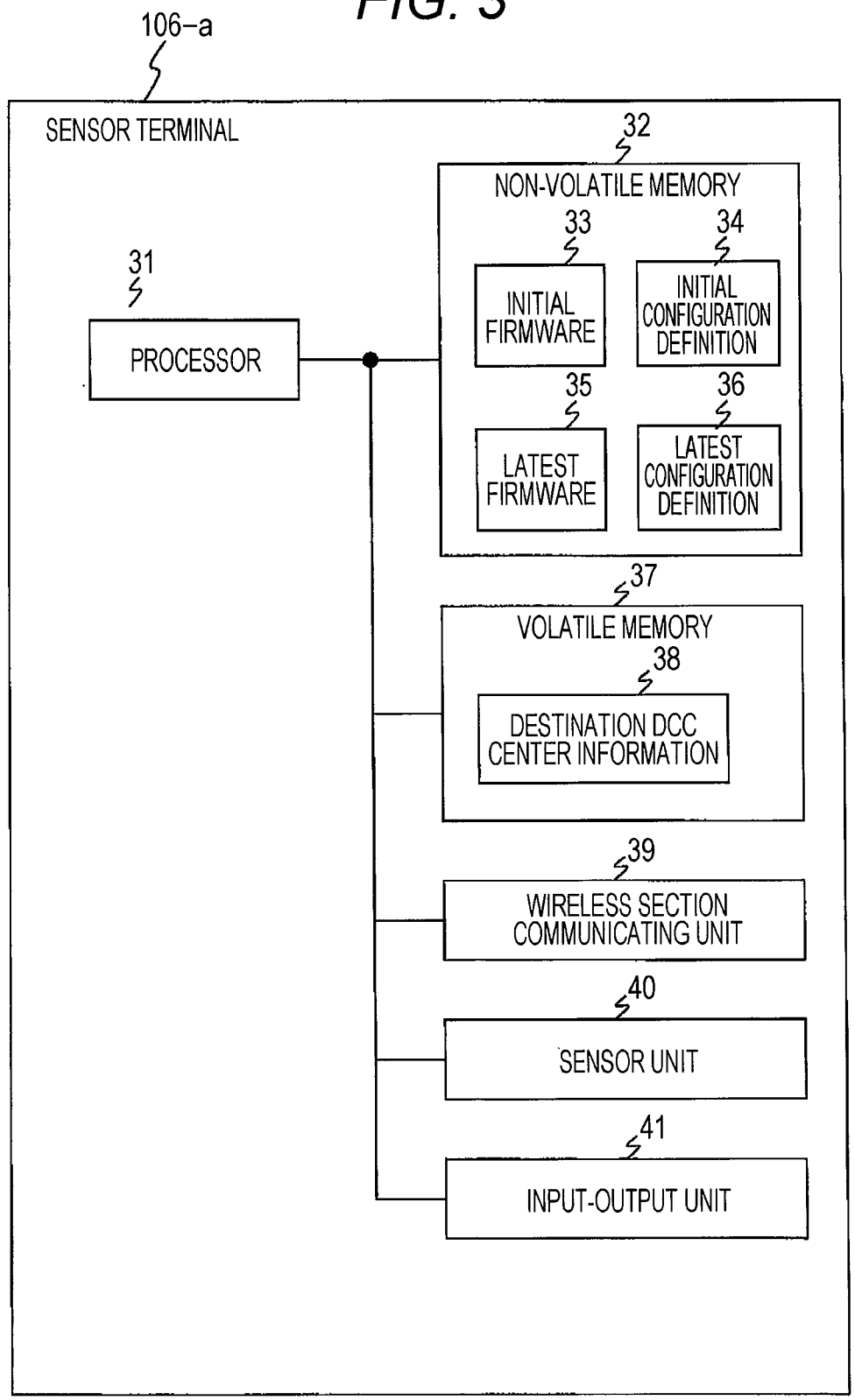
FIG. 3 is a block diagram for describing a configuration of a sensor terminal in the embodiment of the invention.

FIG. 3 is a block diagram for describing a configuration the sensor terminal in the embodiment of the invention.

FIG. 3 is a block diagram showing one example of the sensor terminal 106-*a*. Since the sensor terminals 106-*b* and 106-*c* have the same configurations as that of the sensor terminal 106-*a*, description of the sensor terminals 106-*b* and 106-*c* will be omitted. The sensor terminal 106-*a* includes: a processor 31 which carries out computation; a non-volatile memory 32 for storing an initial firmware 33, an initial configuration definition 34, a latest firmware 35, a latest configuration definition 36 and other data and programs; a volatile memory 37 for temporarily storing destination DCC center information 38 notified from the INIT center 104 and other data and programs; a wireless section communicating unit 39 for communicating with the wireless section 105; a sensor unit 40 for acquiring necessary information; and an input-output unit 41 to which a user inputs information and which displays screens. The sensor unit 40 is an information source of data collected by the DCC center, and the sensor unit 40 need not be provided in a sensor terminal as shown in FIG. 3. The sensor unit 40 may be connected to an external information source if necessary. In this case, a serial connection or two-wire connection is general as an interface which is assumed to be sensor-connected to the sensor terminal 106-*a*. The wireless section communicating unit 39 includes a GPS in terms of hardware in some cases.

The processor 31 operates in accordance with programs of the function units, thereby operating as a function unit for realizing predetermined function. For example, the processor 31 operates in accordance with the latest firmware 35 and the latest configuration definition 36 which is its setting information. Other programs such as initial firmware are also the same. The processor 31 also operates as a function unit which realizes a plurality of processing sets executed by the programs.

Programs which realize the various functions of the sensor terminal 106-*a* and information such as tables are stored in the non-volatile memory 32. One example of the non-volatile memory 32 is a non-temporarily data storage medium capable of reading a calculator such as a non-volatile semiconductor, a hard disk drive, a storage device such as an SSD (Solid State Drive), an IC card, an SD card and a DVD.

The wireless section communicating unit 39 of the sensor terminal 106-*a* connects to a communication terminal A to a communication terminal B (104-*a* to 104-*b*) through the wireless section 105.

Like the communication terminal, after the sensor terminal 106-*a* is initially installed, the sensor terminal 106-*a* is authenticated by the INIT center 101 using the INIT center connection communication ID and then, a DCC center connection communication ID (DCC center connection communication ID) is allocated to the sensor terminal 106-*a*. The sensor terminal operates by one of the two kinds of wireless section communication IDs, and the IDs are switched in accordance with a state. A wireless section communication INIT center connection communication ID and an INIT center connection identifier (IP address and domain) are written in the initial configuration definition 34 in the non-volatile memory 32, but a wireless section communication DCC center connection communication ID and a DCC center connection identifier are not written. The destination DCC center information 38 of the volatile memory 37 is authenticated by the INIT center and then, it is delivered from the INIT center, and the DCC center connection communication ID and the DCC center connection identifier (IP address and domain) are written. These information sets are stored in the volatile memory. According to this, there is an effect that even if the communication terminal is stolen and a program therein is analyzed, since the information concerning the DCC center is eliminated by turning power OFF, and security is enhanced.

Figure 4:
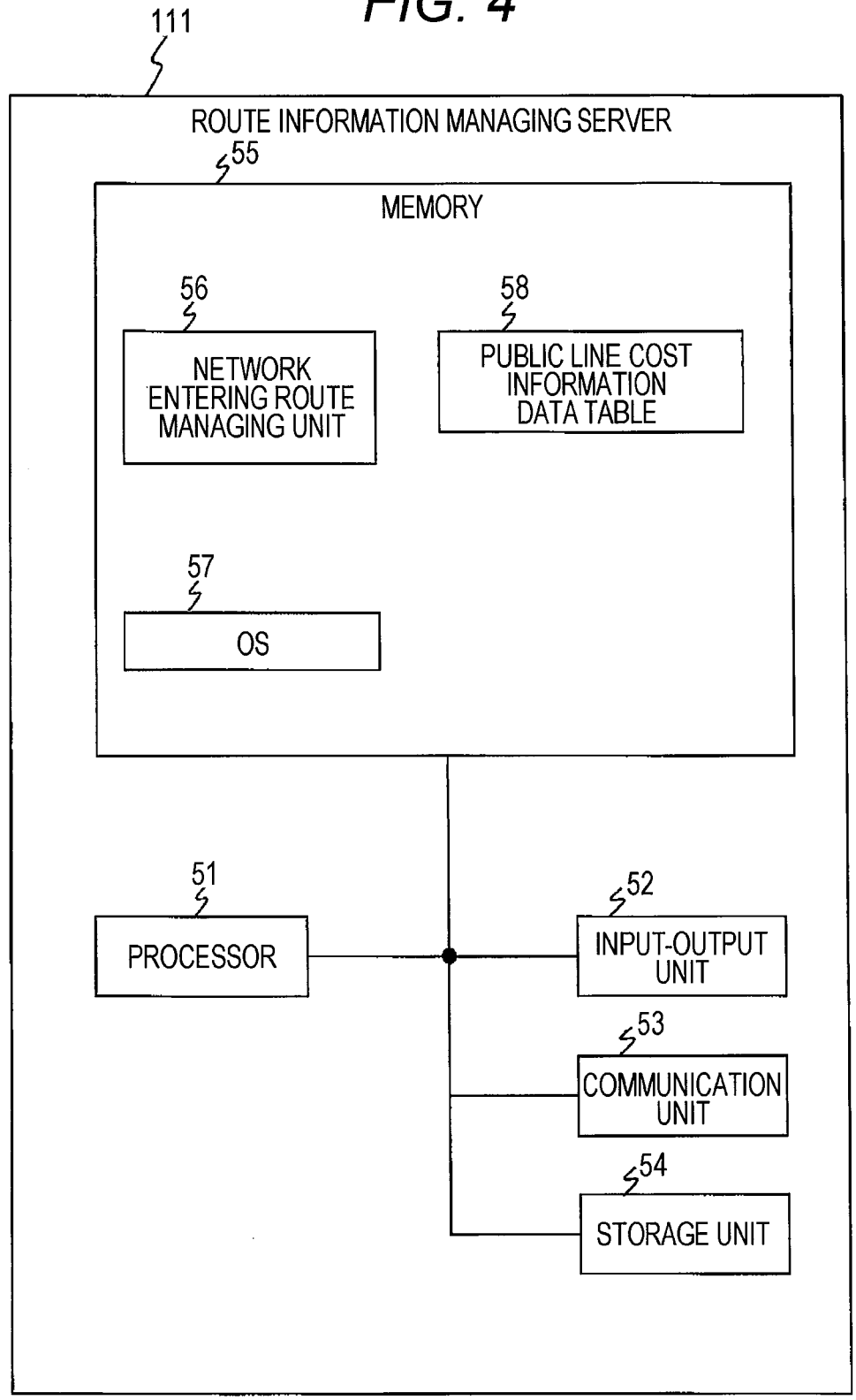
FIG. 4 is a block diagram for describing a configuration of a route information managing server of an INIT center of the embodiment of the invention.

FIG. 4 is a block diagram for describing a configuration of a route information managing server of the INIT center of the embodiment of the invention.

The route information managing server 111 has function to determine an accommodating DCC center of the communication terminals 104-*a* to 104-*b* and the sensor terminals 106-*a* to 106-*c* in liaise with an entire operation managing server 112 and a user information managing server 113 in another INIT center 101.

The route information managing server 111 includes a processor 51 which carries out computation, a memory 55 for storing data and programs, a communicating unit 53 for communicating with the communication terminals 104-*a* to 104-*b* and the sensor terminals 106-*a* to 106-*c* in the center or between the centers, an input-output unit 52 to which an administrator inputs information and which displays screens, and a non-volatile storage unit 54 for storing programs and data.

The memory 55 is provided with an OS (Operating System) 57, the network entering route managing unit 56 having function to determine an accommodating DCC center of the communication terminal and the sensor terminal, and the public line cost information data table 58 for managing a contract state of public line to which the communication terminals connect, the number of packets of the communication terminal used in the current month, and the number of remaining packets which can be used in the current month. They are executed by the processor 51.

The processor 51 operates in accordance with programs of the function units, thereby operating as a function unit to realize predetermined function. For example, the processor 51 operates in accordance with logic of network entering route management, thereby functioning as the network entering route managing unit 56. Other programs are also the same. The processor 51 also operates as a function unit to realize a plurality of processing sets executed by the programs. Information such as programs and table which realize functions of the route information managing server 111 can be stored in a non-temporarily data storage medium capable of reading a calculator such as a storage subsystem configuring the storage unit 54, a non-volatile semiconductor, a hard disk drive, a storage device such as an SSD, an IC card, an SD card and a DVD.

FIG. 5 is a diagram showing one example of a public line cost information data table possessed by the route information managing server of the INIT center.

A communication terminal ID 581, a communication carrier name 582, a communication contract kind 583 with respect to a communication carrier and a packet unit price 584 in that contract are previously set. A usage circumstance 585 stores a current using amount which is counted by the public line packet counter 22 of the communication terminal. The number of remaining packets which can be used in the current month derived from this using amount and the line contract state is a current month remaining amount 586. A count value of the public line packet counter 22 of the communication terminal stored in the usage circumstance 585 is not acquired by frequently inquiring the communication terminal, but is acquired from the communication terminal when it becomes necessary to change a later-described path. Further, when the communication terminal initially connects to the INIT center for example, setting may be conducted such that this is included in terminal information and this is notified, and a packet amount thereafter may be calculated on the side of the INIT center from a data sending cycle of a sensor terminal to which the sensor information is sent via this communication terminal and from an amount of data which is sent one time. According to this, a communication amount with respect to the communication terminal can be reduced.

Figure 6:
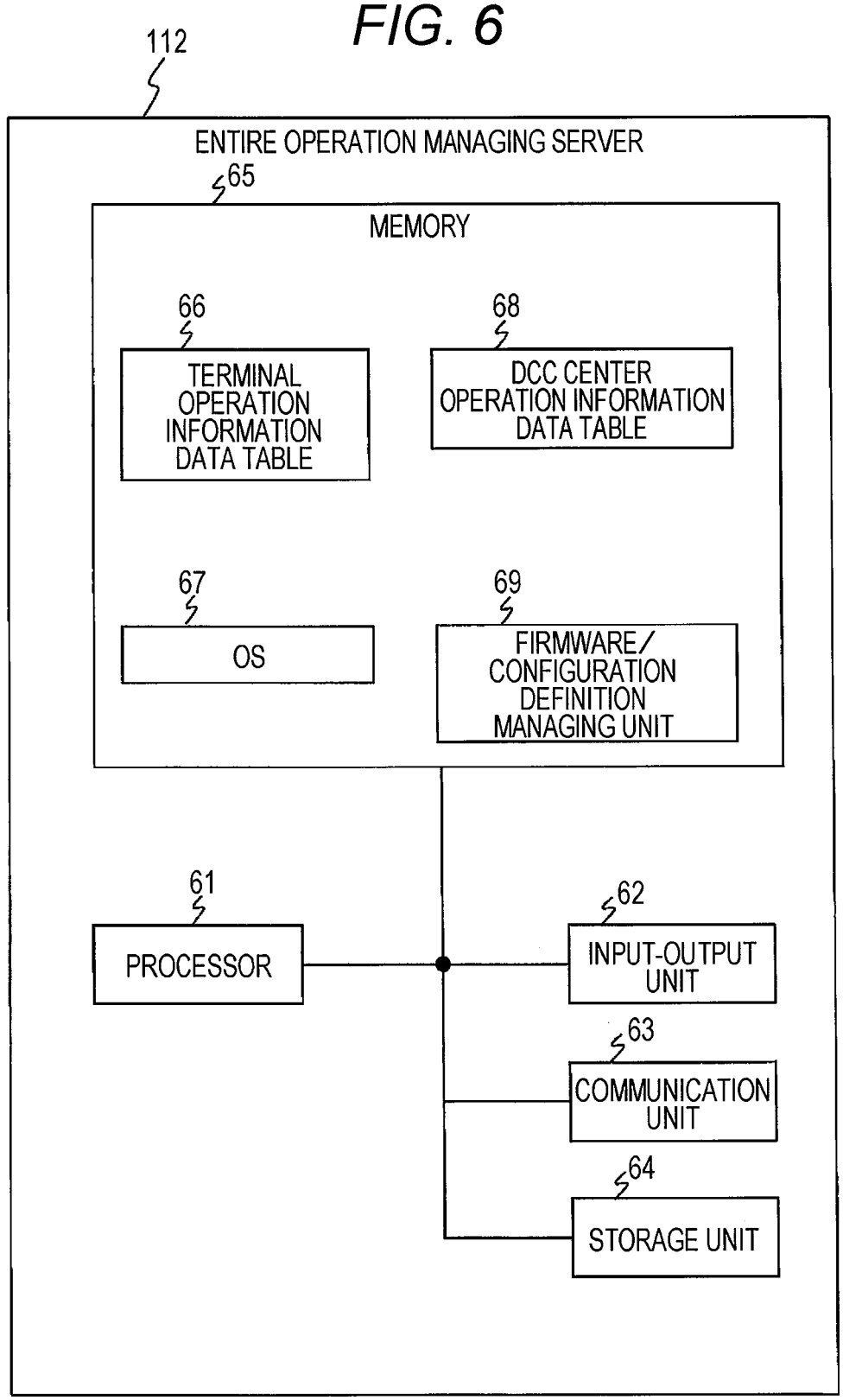
FIG. 6 is a block diagram for describing a configuration of an entire operation managing server of the INIT center in the embodiment of the invention.

FIG. 6 is a block diagram for describing a configuration of the entire operation managing server of the INIT center in the embodiment of the invention.

The entire operation managing server 112 has function to summarize operation information possessed by the operation managing server 115-*a* of the DCC center and to liaise with the route information managing server 111, and function to manage firmware (OS) and configuration definition of the communication terminals 104-*a* to 104-*b* and the sensor terminal.

The entire operation managing server 112 includes a processor 61 which carries out computation, a memory 65 for storing data and programs, a communicating unit 63 for communicating with the communication terminal and the sensor terminals 106-*a* to 106-*c* in the center or between the centers, an input-output unit 62 to which an administrator inputs information and which displays screens, and a non-volatile storage unit 64 for storing programs and data.

The memory 65 is provided with an OS 67, a terminal operation information data table 66 which summarizes operation information of all of the communication terminals and the sensor terminals, a DCC center operation information data table 68 which summarizes operation information of all of the DCC centers, and a firmware/configuration definition managing unit 69 which manages firmware and configuration definition of all of the communication terminals 104-*a* to 104-*b* and the sensor terminals 106-*a* to 106-*c*. They are executed by the processor 61.

The processor 61 operates in accordance with programs of the function units, thereby operating as a function unit which realizes predetermined function. For example, the processor 61 operates in accordance with logic which summarizes terminal operation information from the DCC center, and produces the terminal operation information data table 66. Other programs are also the same. The processor 61 operates also as a function unit which realizes a plurality of processing sets executed by the programs.

FIG. 7 is a diagram showing one example of the terminal operation information data table possessed by the entire operation managing server of the INIT center.

Stored in the terminal operation information data table are an ID 661 of a terminal, a terminal kind 662 of the communication terminal or the sensor terminal, an installation place 663, a destination DCC center 664 of each of the terminals, a radio field strength 665 of a wireless section, a destination communication terminal 666 concerning the sensor terminal, operation time 667 of each of the terminals, communication stability 668 and response time 669. An installation place which is determined from a GPS or a global IP address possessed by each of the communication terminals 104-*a* to 104-*b* is stored in the installation place 663. The INIT center calculates the communication stability 668 from a rate which is collected without missing when data is periodically collected. The response time 669 measures response time concerning communication between the center and the terminal and stores the measured response time.

FIG. 8 is a diagram showing one example of the DCC center operation information data table possessed by the entire operation managing server of the INIT center.

Stored in the DCC center operation information data table are a DCC center name (or information capable of uniquely specifying DCC center such as address) 681, a contract line band 682 of DCC center, line average traffic 683, line peak traffic 684, a resource state 685 of a server of DCC center, and maintenance-scheduled day and time 686. The line average traffic 683 and the line peak traffic 684 acquire and store information from a network device such as a communication network of a carrier. The server resource state 685 stores a resource state of a CPU, a memory and a disk of the server.

Figure 9:
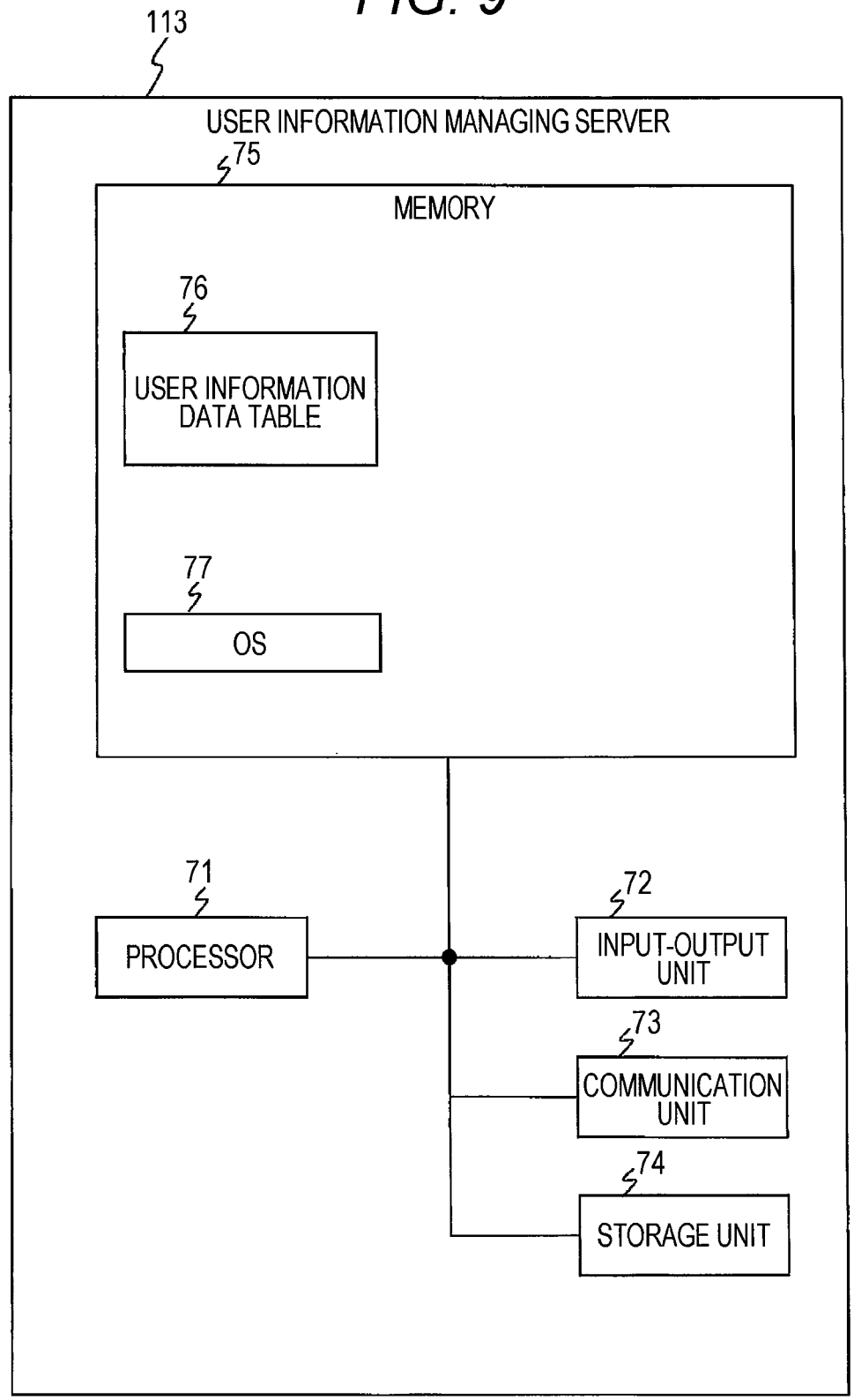
FIG. 9 is a block diagram for describing a configuration of a user information managing server of the INIT center in the embodiment of the invention.

FIG. 9 is a block diagram for describing a configuration of the user information managing server in the INIT center in the embodiment of the invention.

The user information managing server 113 has function to manage user information which is registered in the system.

The user information managing server 113 includes a processor 71 which carries out computation, a memory 75 for storing data and programs, a communicating unit 73 for communicating with the communication terminal and the sensor terminal in the center or between the centers, an input-output unit 72 to which an administrator inputs information and which displays screens, and a non-volatile storage unit 74 for storing programs and data.

The memory 75 is provided with an OS 77 and a user information data table 76 which summarizes user information registered in the system. They are executed by the processor 71. The processor 71 operates in accordance with programs of the function units, thereby operating as a function unit which realizes predetermined function. For example, the processor 71 operates in accordance with logic which summarizes user information, and produces the user information data table 76. Other programs are also the same. The processor 71 operates also as a function unit which realizes a plurality of processing sets executed by the programs.

FIG. 10 is a diagram showing one example of the user information data table possessed by the user information managing server in the INIT center.

Stored in the user information data table are information 761 capable of uniquely specifying a user (electric power company) name or a user, an ID 762 of a communication terminal possessed by the user, an ID 763 of a sensor terminal possessed by the user, a data acquisition cycle 764, a data kind 765 and a DCC center preparation state information 766.

Figure 11:
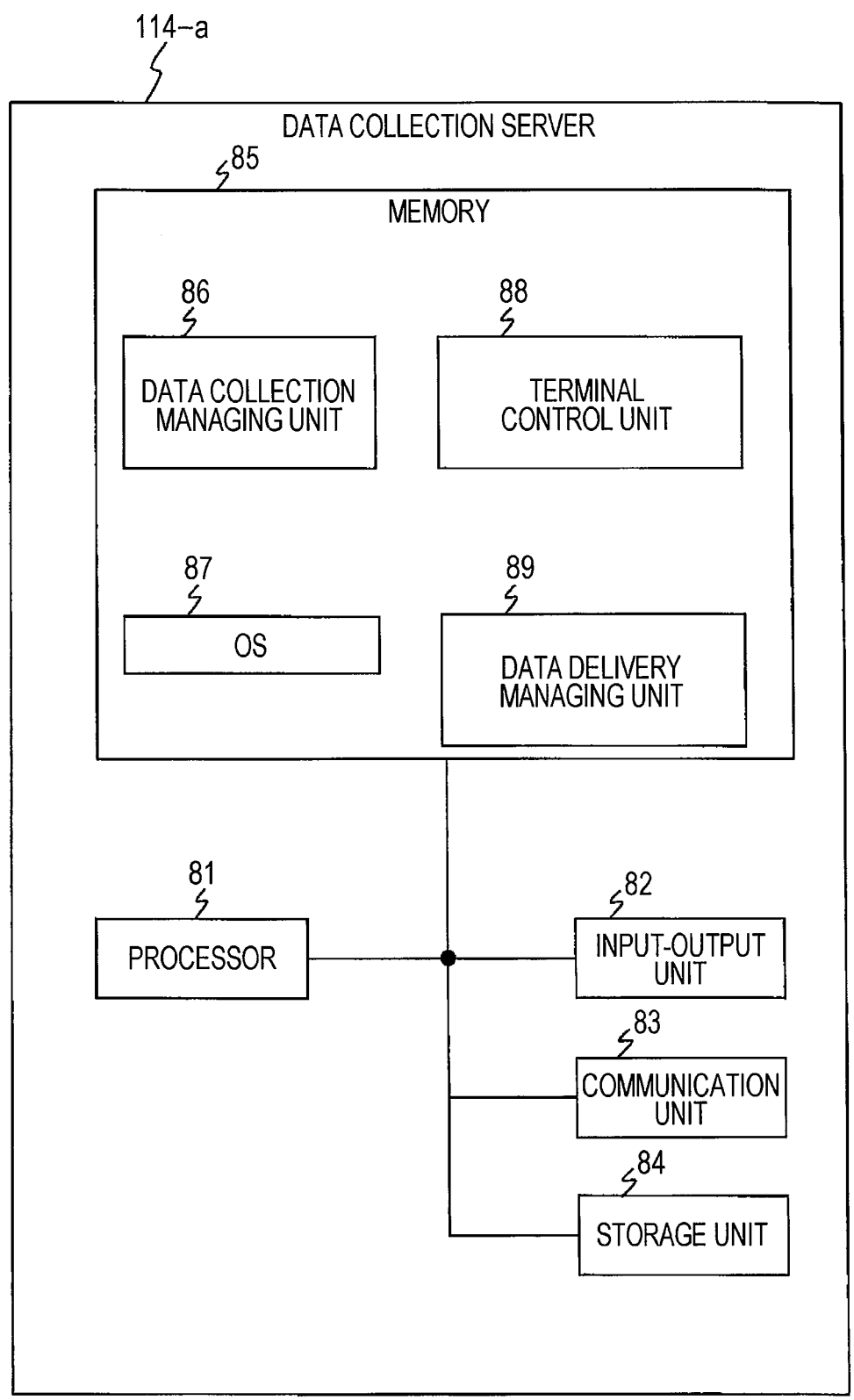
FIG. 11 is a block diagram for describing a configuration of a data collecting server in a DCC center A in the embodiment of the invention.

FIG. 11 is a block diagram for describing a configuration of the data collecting server in the DCC center A in the embodiment of the invention.

The data collecting server 114-*a* in the DCC center A102-*a* and the data collecting server 114-*b* in the DCC center B102-*b* have the same configurations.

The data collecting server 114-*a* has function to periodically collect data from the sensor terminals 106-*a* to 106-*c*, function to control command issuance to the sensor terminals 106-*a* to 106-*c* and the communication terminals 104-*a* to 104-*b*, and function to deliver firmware and configuration definition to the sensor terminals 106-*a* to 106-*c* and the communication terminals 104-*a* to 104-*b*. The data collecting server 114-*a* includes a processor 81 which carries out computation, a memory 85 for storing data and programs, a communicating unit 83 for communicating with the communication terminal and the sensor terminal in the center or between the centers, an input-output unit 82 to which an administrator inputs information and which displays screens, and a non-volatile storage unit 84 for storing programs and data.

The memory 85 includes: an OS 87; collecting function of data such as sensor information from the sensor terminals 106-*a* to 106-*c* and the communication terminals 104-*a* to 104-*b*, statistic information and operational information; terminal control function for issuing commands to the sensor terminals 106-*a* to 106-*c* and the communication terminals 104-*a* to 104-*b*; and data delivery function for delivering firmware and configuration definition to the sensor terminal and the communication terminal. They are executed by the processor 81.

The processor 81 operates in accordance with programs of the function units, thereby operating as a function unit which realizes predetermined function. For example, the processor 81 operates in accordance with logic of data collection management, thereby functioning as a data collection managing unit 86. Other programs are also the same. Further, the processor 81 operates also as a function unit which realizes a plurality of processing sets executed by the programs.

Figure 12:
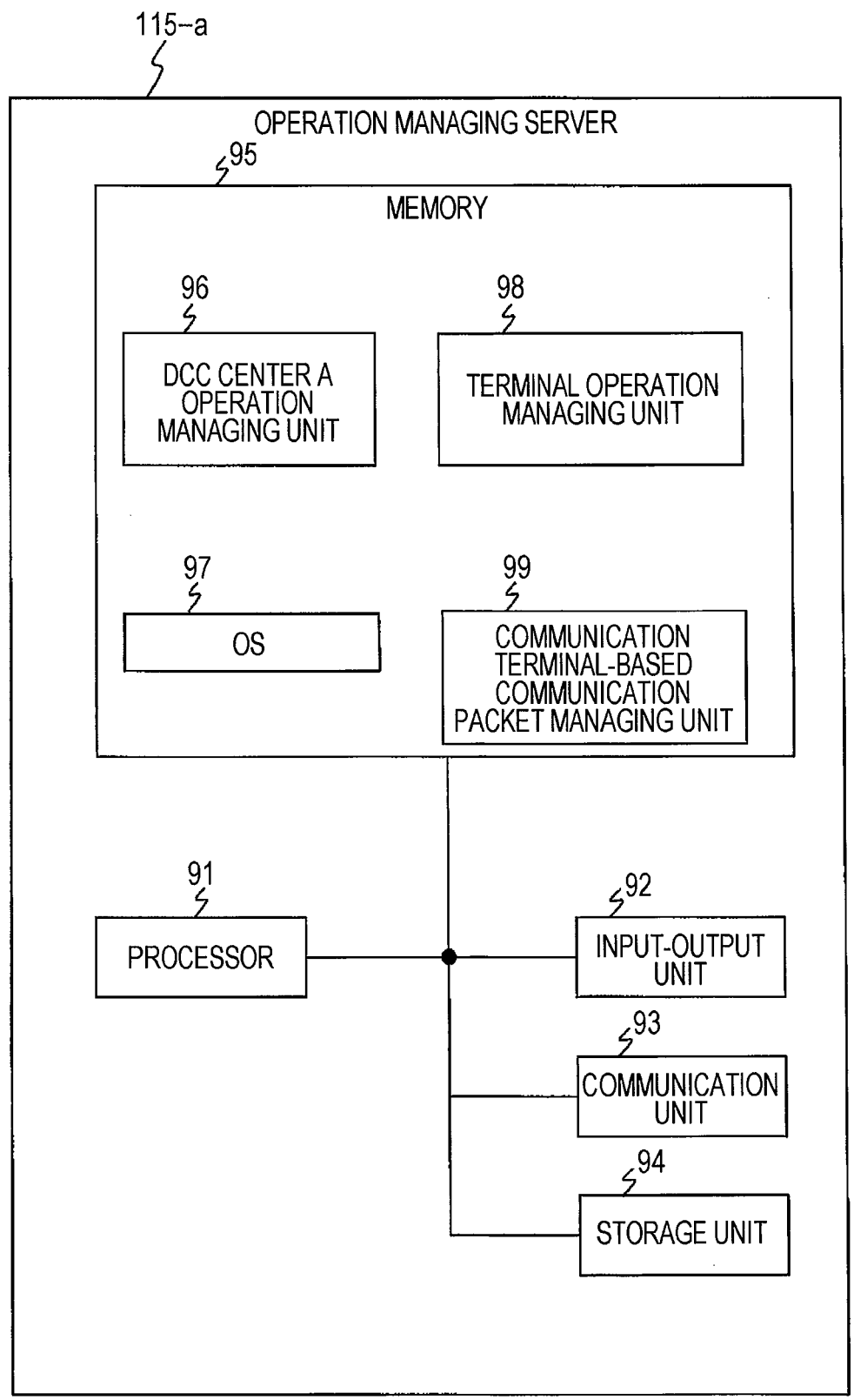
FIG. 12 is a block diagram for describing a configuration of an operation managing server in the DCC center in the embodiment of the invention.

FIG. 12 is a block diagram for describing a configuration of the operation managing server in the DCC center in the embodiment of the invention.

The operation managing server 115-*a* in the DCC center A102-*a* and the operation managing server 115-*b* in the DCC center B102-*b* have the same configurations.

The operation managing server 115-*a* has function to manage a server and a network device in the DCC center A102-*a* and a line operation, a function to manage the sensor terminals 106-*a* to 106-*c* and the communication terminals 104-*a* to 104-*b* accommodated in the DCC center A102-*a*, and function to manage the number of communication packets of the communication terminals 104-*a* to 104-*b* accommodated in the DCC center A102-*a*.

The operation managing server 115-*a* includes a processor 91 which carries out computation, a memory 95 for storing data and programs, a communicating unit 93 for communicating with the communication terminal and the sensor terminal in the center or between the centers, an input-output unit 92 to which an administrator inputs information and which displays screens, and a non-volatile storage unit 94 for storing programs and data.

The memory 95 is provided with an OS 97, a DCC center A operation managing unit 96 for managing operation information and line traffic information of a server and a network device in the DCC center A102-*a*, a terminal operation managing unit 98 for collecting and managing statistic information and operational information from the communication terminal and the sensor terminal through the data collection managing unit 86, and a communication terminal-based communication packet managing unit 99 for collecting and managing the number of communication packets which are sent to and received from public line of the communication terminal. They are executed by the processor 91.

The processor 91 operates in accordance with programs of the function units, thereby operating as a function unit which realizes predetermined function. For example, the processor 91 operates in accordance with logic of DCC center A operation management, thereby functioning as the DCC center A operation managing unit 96. Other programs are also the same. Further, the processor 91 operates also as a function unit which realizes a plurality of processing sets executed by the programs.

Figure 13:
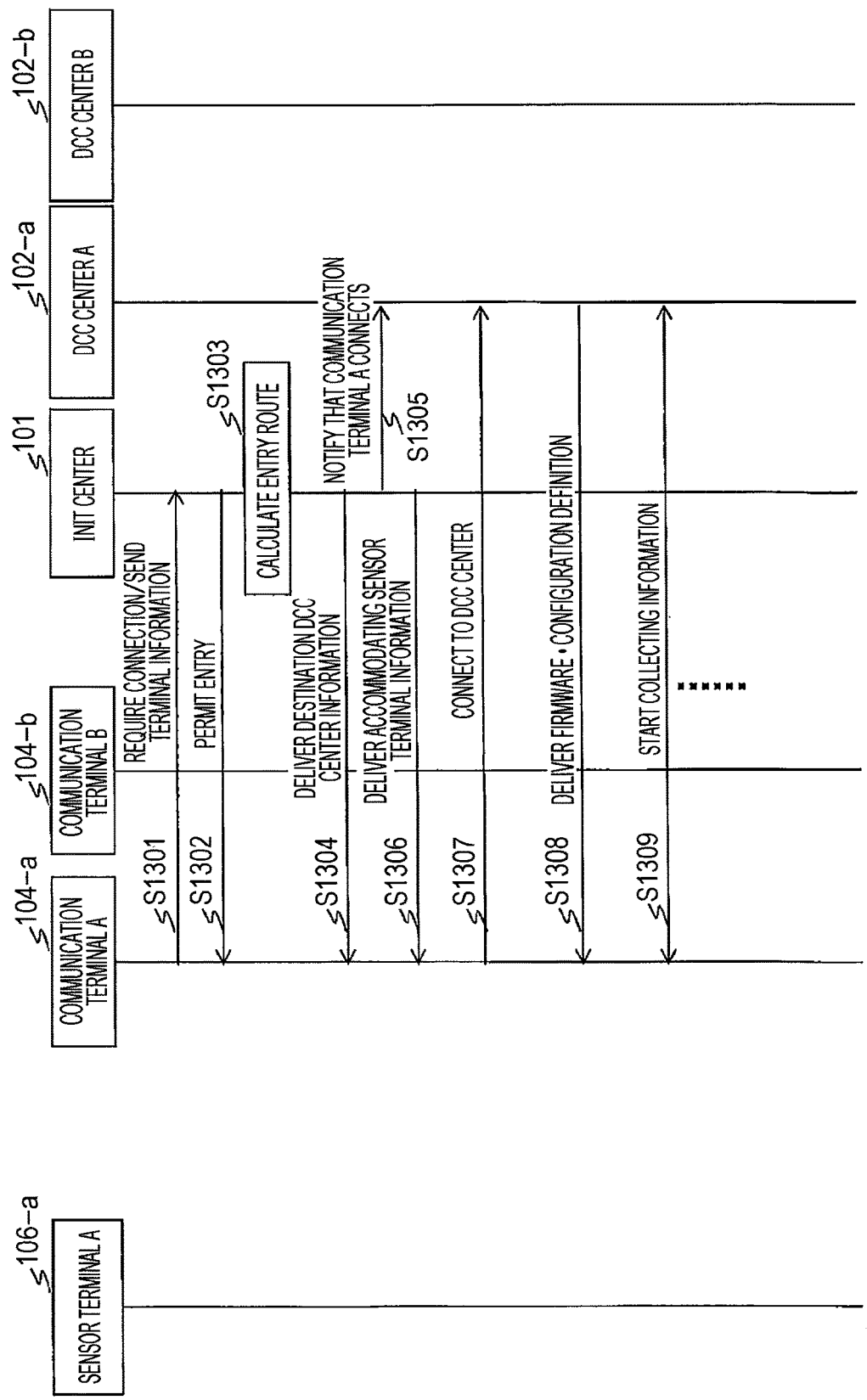
FIG. 13 is a sequence diagram for describing a network entering operation of the communication terminal in the embodiment of the invention.

FIG. 13 is a sequence diagram for describing a network entering operation of the communication terminal in the embodiment of the invention.

Figure 14:
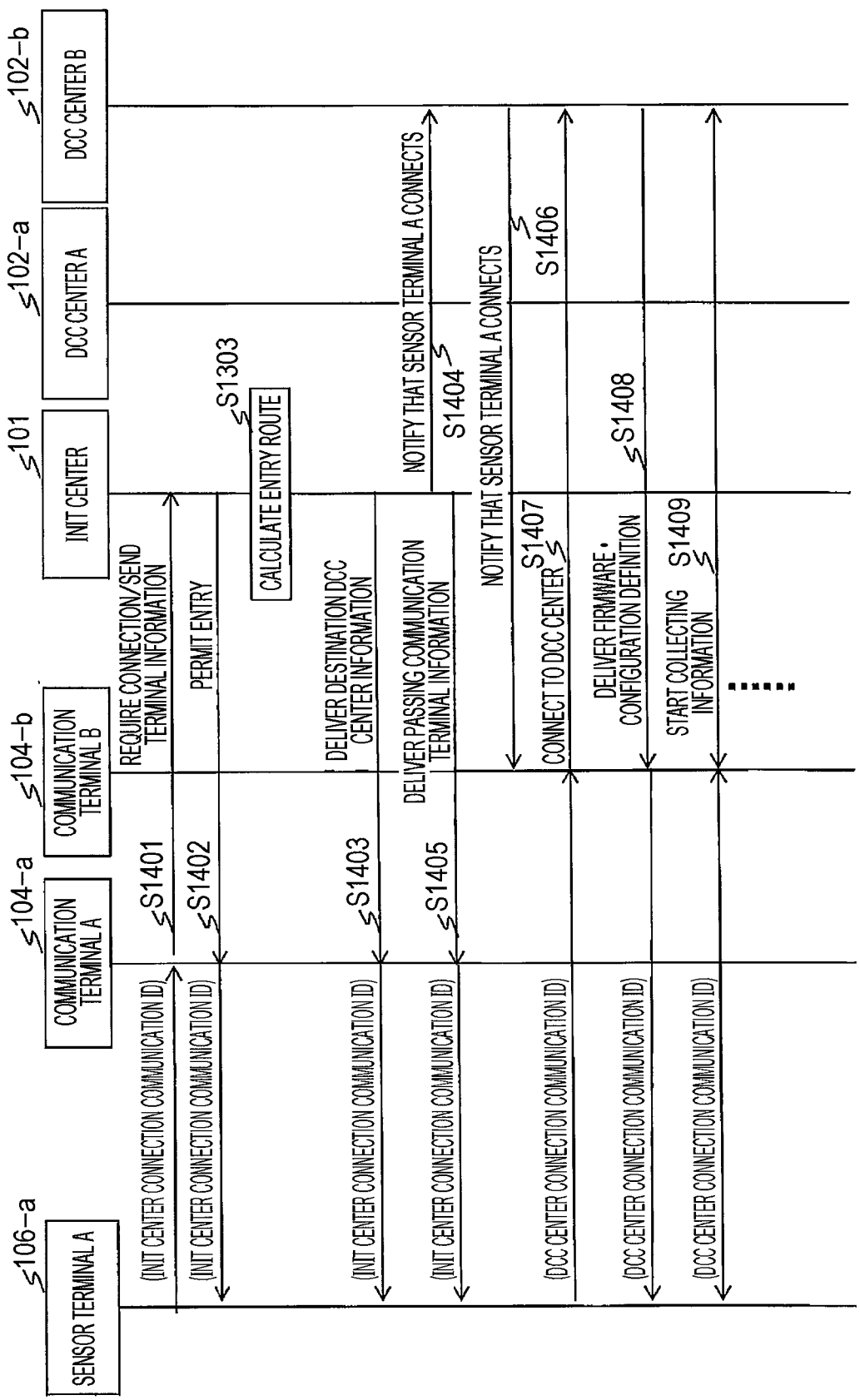
FIG. 14 is a sequence diagram for describing a network entering operation of the sensor terminal in the embodiment of the invention.

FIG. 14 is a sequence diagram for describing a network entering operation of the sensor terminal in the embodiment of the invention.

In FIG. 13, the communication terminal first requires the INIT center for connection, and sends terminal information (S1301). The INIT center authenticates a terminal, and sends entry permission to the communication terminal (S1302). The INIT center calculates entering route (S1303), delivers destination DCC center information to the communication terminal (S1304), and notifies that the communication terminal connects to a DCC center A which is selected as destination (S1305). The INIT center delivers information of a sensor terminal accommodated in the communication terminal to the communication terminal (S1306).

The communication terminal connects to the DCC center based on the destination DCC center information delivered from the INIT center (S1307). The DCC center A delivers necessary firmware and configuration definition to the communication terminal (S1308). The communication terminal stores the received firmware and configuration definition in the memory, starts collecting information from the sensor terminal, and sends the collected information to the DCC center (S1309).

As shown in FIG. 14, in a network entry action of the sensor terminal, the sensor terminal A first requires the INIT center for connection through the communication terminal A using the INIT center connection communication ID, and sends the terminal information (S1401). The INIT center authenticates the terminal, and sends entry permission to the sensor terminal A via the communication terminal A (S1402). The INIT center calculates entering route (S1303), and delivers the destination DCC center information to the sensor terminal A through the communication terminal A (S1403). The INIT center notifies that sensor terminal A connects to the DCC center B which is selected as destination (S1404). In the example in FIG. 14, when the entering route is calculated, a path is determined such that the sensor terminal A connects to the DCC center B via the communication terminal B. Hence, the INIT center delivers communication terminal information to the sensor terminal A via the communication terminal A through the communication terminal B (S1405). The DCC center B notifies that the sensor terminal A connects to the communication terminal B (S1406). The sensor terminal A connects to the DCC center B based on the destination DCC center information delivered from the INIT center (S1407). The DCC center B delivers necessary firmware and configuration definition to the sensor terminal A via the communication terminal B (S1408). The sensor terminal stores the received firmware and configuration definition in the memory, starts collecting information, and sends the collected information to the DCC center B via the communication terminal B (S1409).

Next, calculation processing of entering route will be described.

Figure 15:
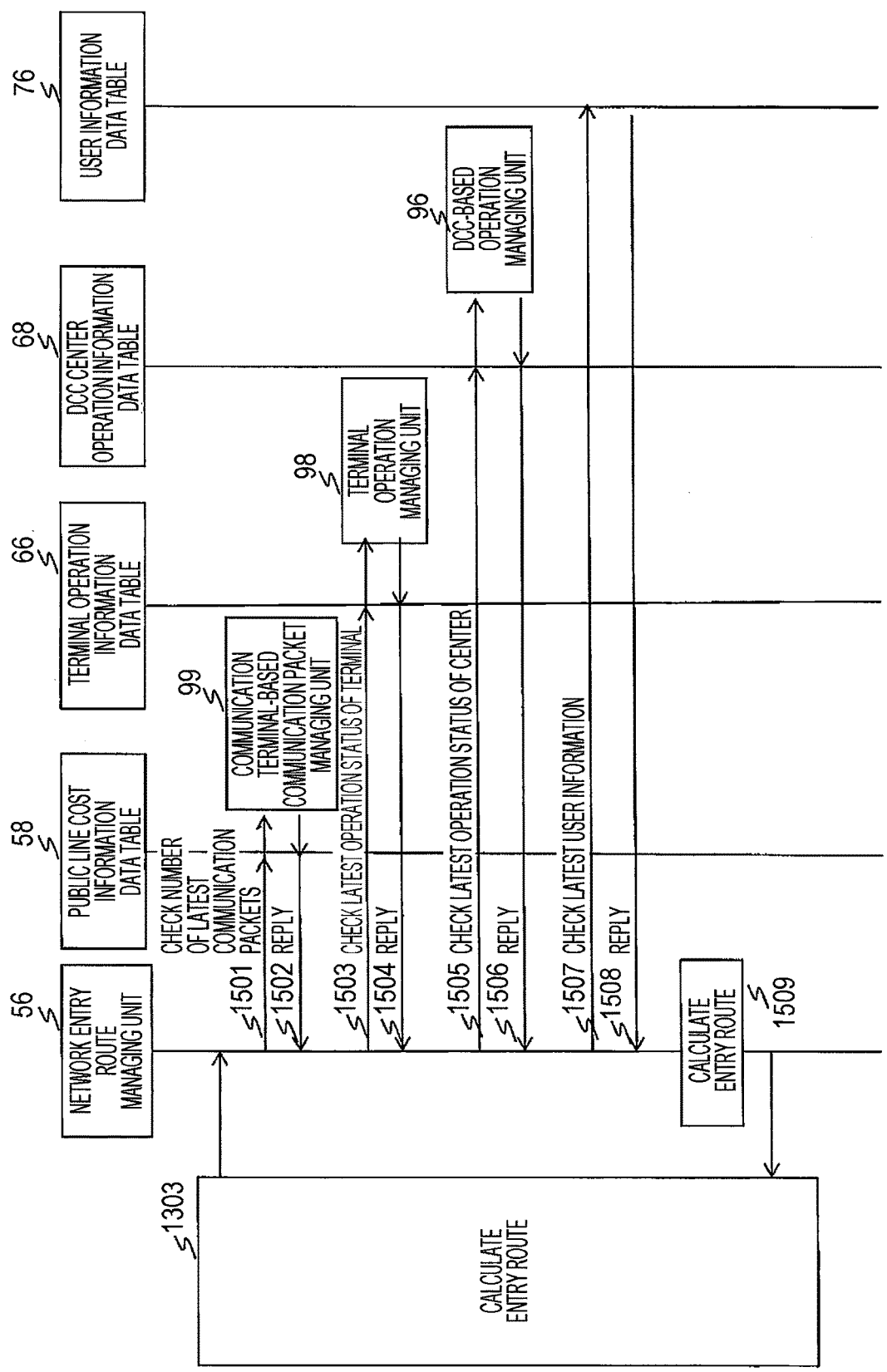
FIG. 15 is a sequence diagram for describing a calculating operation of an entering route in the embodiment of the invention.

FIG. 15 is a sequence diagram for describing a calculating operation of the entering route in the embodiment of the invention.

As shown in FIG. 15, the network entering route managing unit 56 of the route information managing server 111 of the INIT center 101 obtains information which is necessary for calculating the entering route from the public line cost information data table 58 shown in FIG. 5, the terminal operation information data table 66 shown in FIG. 7, the DCC center operation information data table 68 shown in FIG. 8 and the user information data table 76 shown in FIG. 10. Information sets are summarized in the respective servers in the respective INIT centers 101, and the information sets are incorporated in calculation conditions.

Sequence when the entering route of the network entering route managing unit 56 is calculated is shown in FIG. 15 as one example. Here, S1303 is a task of the network entering route managing unit 56. Then, S1501 to S1508 check information which is necessary for calculation and eventually, route is calculated based on precedence which is set in entering route calculation S1509.

Concerning the public line cost information data table 58 in FIG. 5, the current month remaining amount 586 is utilized for calculating the entering route.

Concerning the terminal operation information data table 66 in FIG. 7, the communication stability 668 and the response time 669 are utilized for calculating the entering route.

Concerning the DCC center operation information data table 68 in FIG. 8, the line average traffic 683, the line peak traffic 684 and the server resource state (CPU, memory, disk) 685 are utilized for calculating the entering route.

Concerning the user information data table 76 in FIG. 10, the data acquisition cycle 764 is utilized for calculating the entering route.

Since the configuration that the sensor terminal sends sensor information to the DCC center via the communication terminal is described as the example in this embodiment, the following specific routes exist as the routes.

(1) A route through which the communication terminal sends and receives management and control information of the DCC center and the communication terminal itself.

(2) A route through which the sensor terminal sends and receives sensor information, and management and control information of the sensor terminal.

When the sensor terminal A sends the sensor information via the communication terminal A for example, the route (1) of the communication terminal A and the destination DCC center, and the route (2) of the sensor terminal A and the destination DCC center may be different DCC centers. When a plurality of sensor terminals A and B are connected to the communication terminal A, the sensor terminals A and B are connected to different DCC centers through different routes via the same communication terminal A in some cases.

Based on information (installation destination information) of the (i) communication terminal and information of the table managed by the (ii) INIT center in the case of the route (1), and based on information (installation destination information) of the (i) communication terminal, information of the table managed by the (ii) INIT center, and information (radio field strength with respect to communication terminal) of the (iii) sensor terminal in the case of the route (2), information which is previously referred to as a reference is provided with precedence, a communication path (via which communication terminal or via communication network of which carrier) and a destination DCC center are selected in accordance with a value of information having high precedence. Selection of the communication path and precedence of information used for selecting a DCC center can be set.

Concerning a sensor terminal, a destination DCC center and a route may independently be selected, or may be selected in order, or one of them may first be selected in order, and the other one may be selected in association with the result of the first selection.

Figure 16:
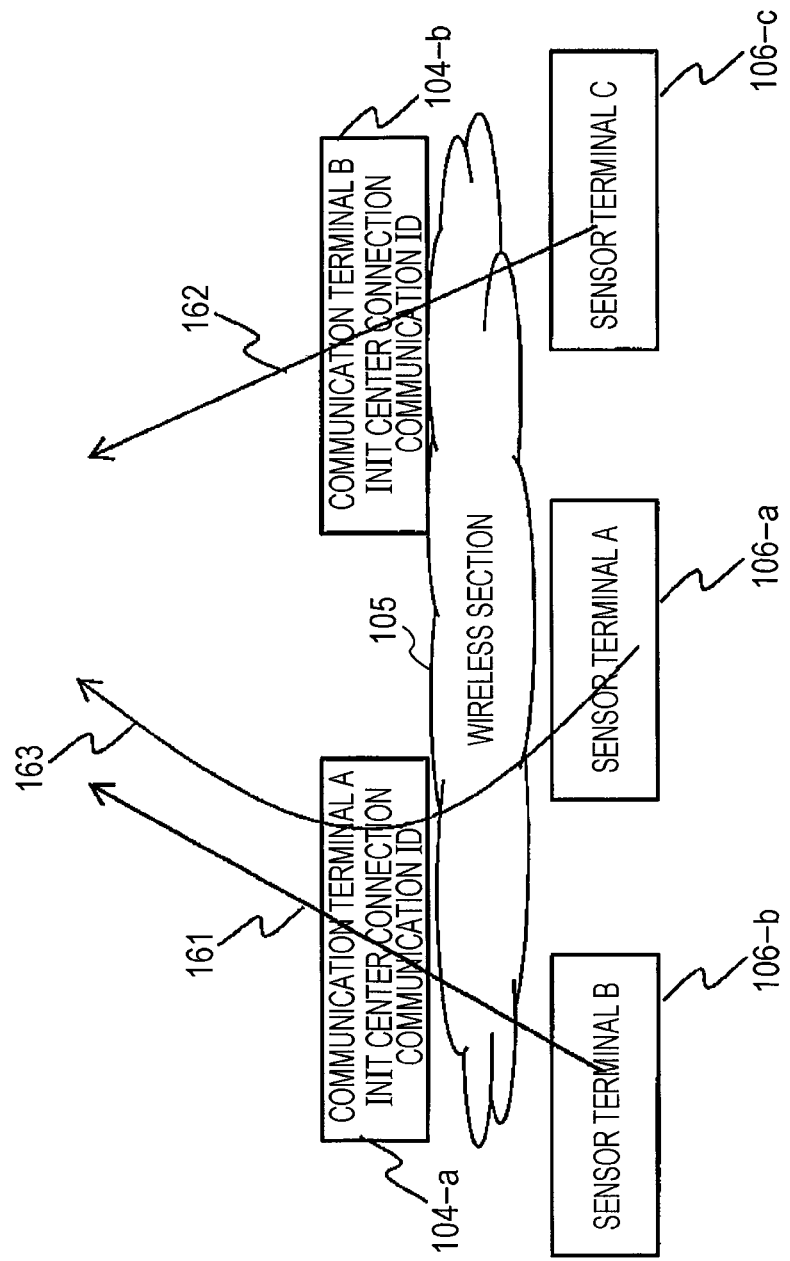
FIG. 16 is a diagram showing an image of route section.
Figure 17:
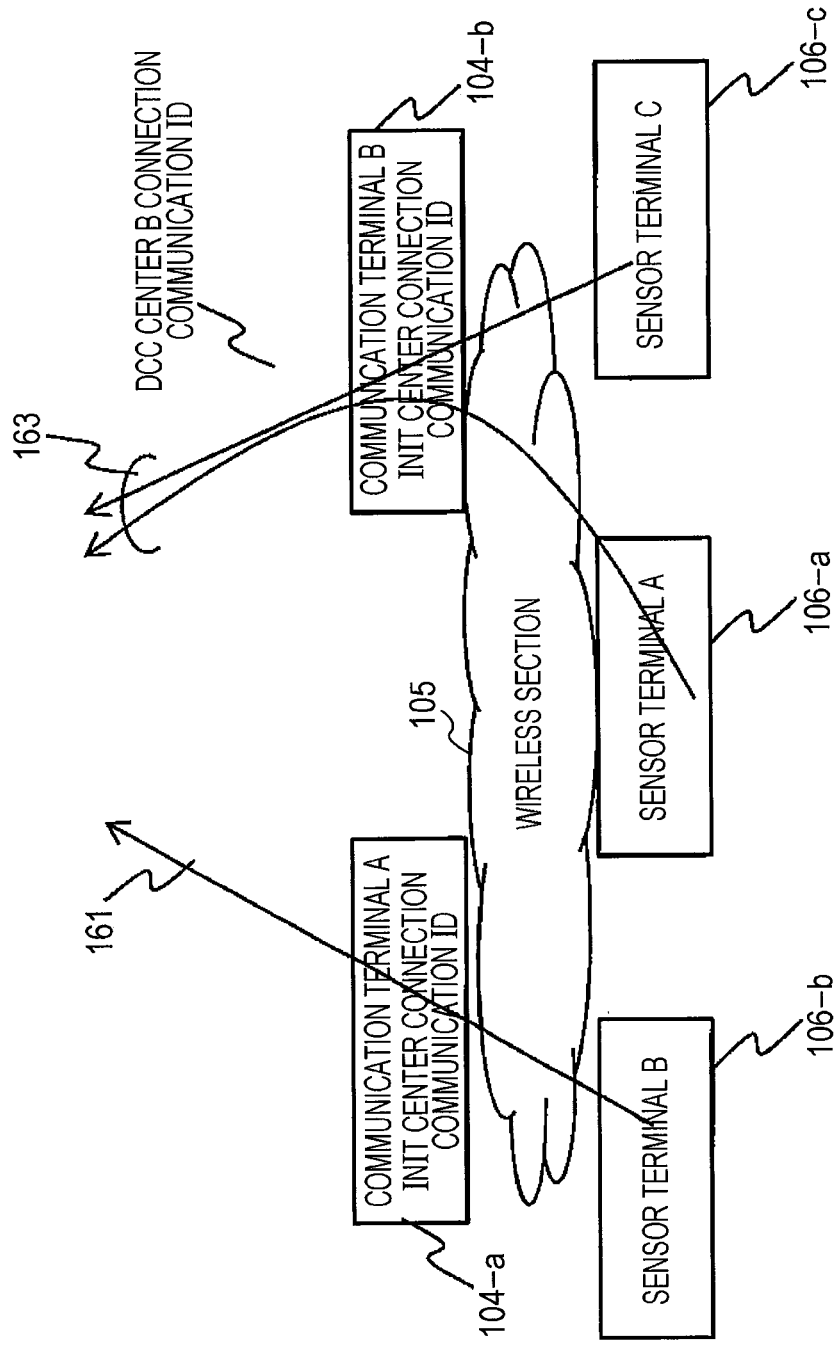
FIG. 17 is a diagram showing the image of route section.

FIGS. 16 and 17 show images of route selection.

When all of communication terminals and sensor terminals connected to the wireless section 105 are to be connected the INIT center 101, they previously connect to the INIT center 101 using the INIT center connection communication ID stored in the initial configuration definition in the non-volatile memory of the terminal. As one example of the INIT center connection communication ID, a fixed value having a communication ID such as an SSID in the case of Wi-Fi and a PAN-ID in the case of Zigbee is used.

After it is authenticated by the INIT center 101, a DCC center connection communication ID (DCC center connection communication ID) is allocated as a portion of communication terminal information which is connected from the INIT center 101.

In the example shown in FIG. 16, the communication terminal A104-*a* and the communication terminal B104-*b* are in states capable of always using INIT center connection communication IDs.

A sensor terminal B106-*b* has been connected to the INIT center and authentication has been completed, and the sensor terminal B106-*b* connects to the DCC center A via the communication terminal A104-*a* using the DCC center A connection communication ID which is notified from the INIT center (161). Similarly, a sensor terminal C106-*c* connects to the DCC center B102-*b* via the communication terminal 104-*b* using the DCC center B connection communication ID (162). The sensor terminal 106-*a* is in an initial connecting state before it connects to the DCC center, the sensor terminal A106-*a* connects to the INIT center using the INIT center connection communication ID, and the sensor terminal A106-*a* is in communication with the INIT center through the communication terminal A104-*a* (communication 163 with INIT center). This state is sequences S1401 to S1403 and S1405 in FIG. 14.

FIG. 17 shows a state in which authentication of the sensor terminal A106-*a* is completed from the state shown in FIG. 16, the INIT center notifies a DCC center B connection communication ID as destination, a communication path via the communication terminal B104-*b* is specified as a communication path, and the sensor terminal A106-*a* is in communication with the DCC center B102-*b* via the communication terminal B104-*b* using the DCC center B connection communication ID notified from the INIT center. This state corresponds to S1407 to the last in FIG. 14. Although the example in which the communication carriers A to B103-*a* to 103-*b* connect to the respective centers via the Internet 107 is described, they may be composed of a private network or a WAN.

Figure 18:
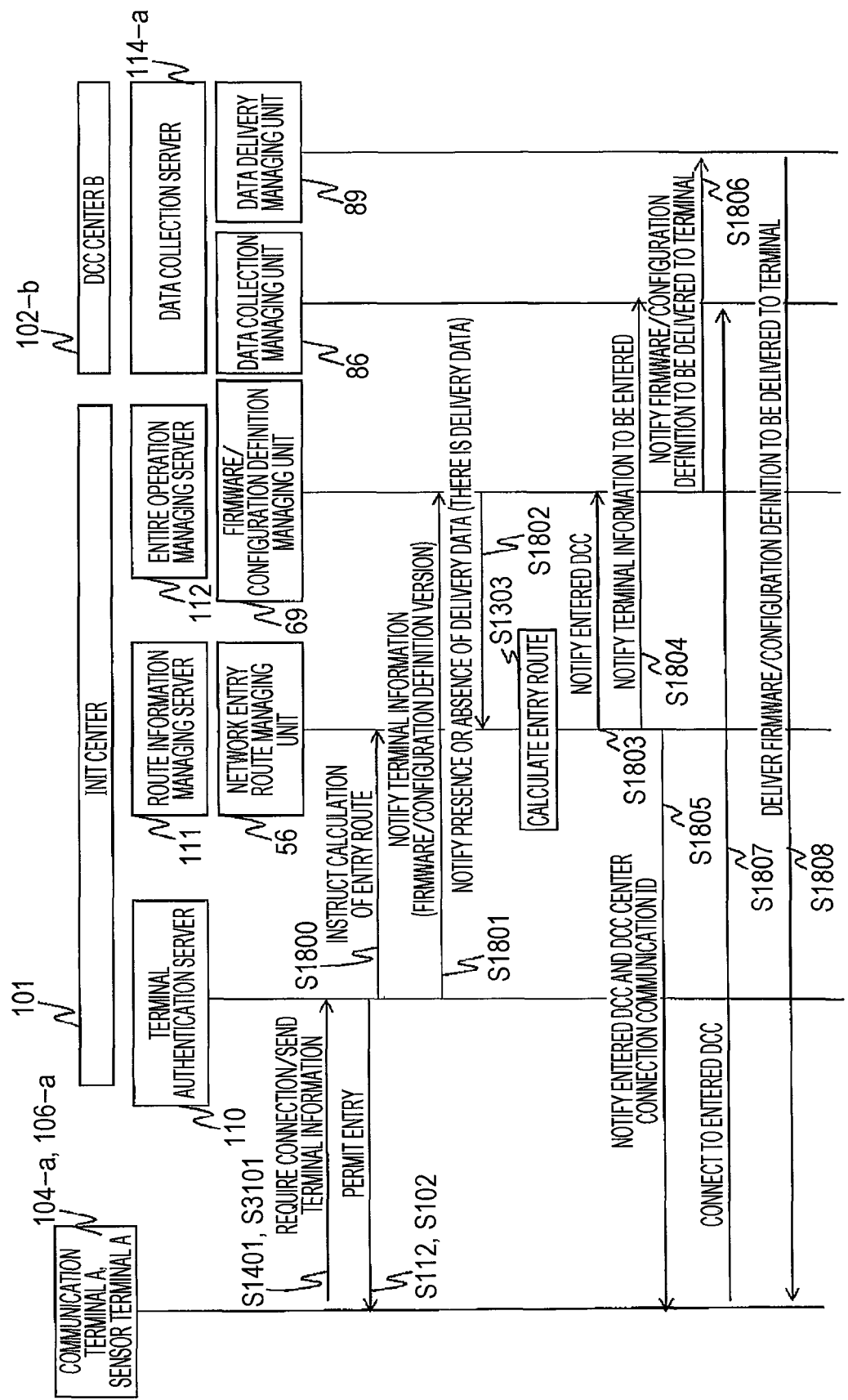
FIG. 18 is a sequence diagram for describing an operation at the time of renewal processing of firmware or configuration definition of the sensor terminal or the communication terminal in the embodiment of the invention.

FIG. 18 is a sequence diagram for describing an operation at the time of renewal processing of firmware or configuration definition of the sensor terminal or the communication terminal in the embodiment of the invention.

The INIT center 101 receives notification of terminal information including firmware or configuration definition of the communication terminal 104-*a* or the sensor terminal 106-*c* which requires for connection or which sends terminal information (S1301 or S1401) (S1801), checks the contents of the terminal information, and notifies the network entering route managing unit 56 that delivery of the firmware/configuration definition to the network entering route managing unit 56 is acceptable or not (S1802). If it is necessary to deliver the same, traffic becomes heavier than normal data collection. Therefore, in calculation of entering route (S1303), a DCC center having room in terms of traffic or server operation, or one of public lines having largest room from usage state of the current month is selected. When it is necessary to deliver the firmware/configuration definition, in this calculation processing, precedence of information which is reference of selection of a DCC center, a server resource state of the DCC center, line average traffic and line peak traffic are made high, and the communication path can be selected by enhancing precedence of the current month remaining amount of public line.

After an entry destination DCC is determined, the firmware/configuration definition managing unit 69 and the data collection managing unit 86 are notified of this fact (S1803, S1804). The notified firmware/configuration definition managing unit 69 notifies a data delivery managing unit 89 of the data which is to be delivered (S1806), and after the object terminal enters the DCC center, the data delivery managing unit 89 delivers the data (S1808).

After the delivery operation is completed, the terminal is brought into an initial operation state, and again requires the INIT center for connection. In this case, since the firmware/configuration definition version is latest, a notification of presence or absence of delivery data of S132 has no delivery data, and an entering route calculates the entry destination DCC center using normal data collection calculation logic.

Figure 19:
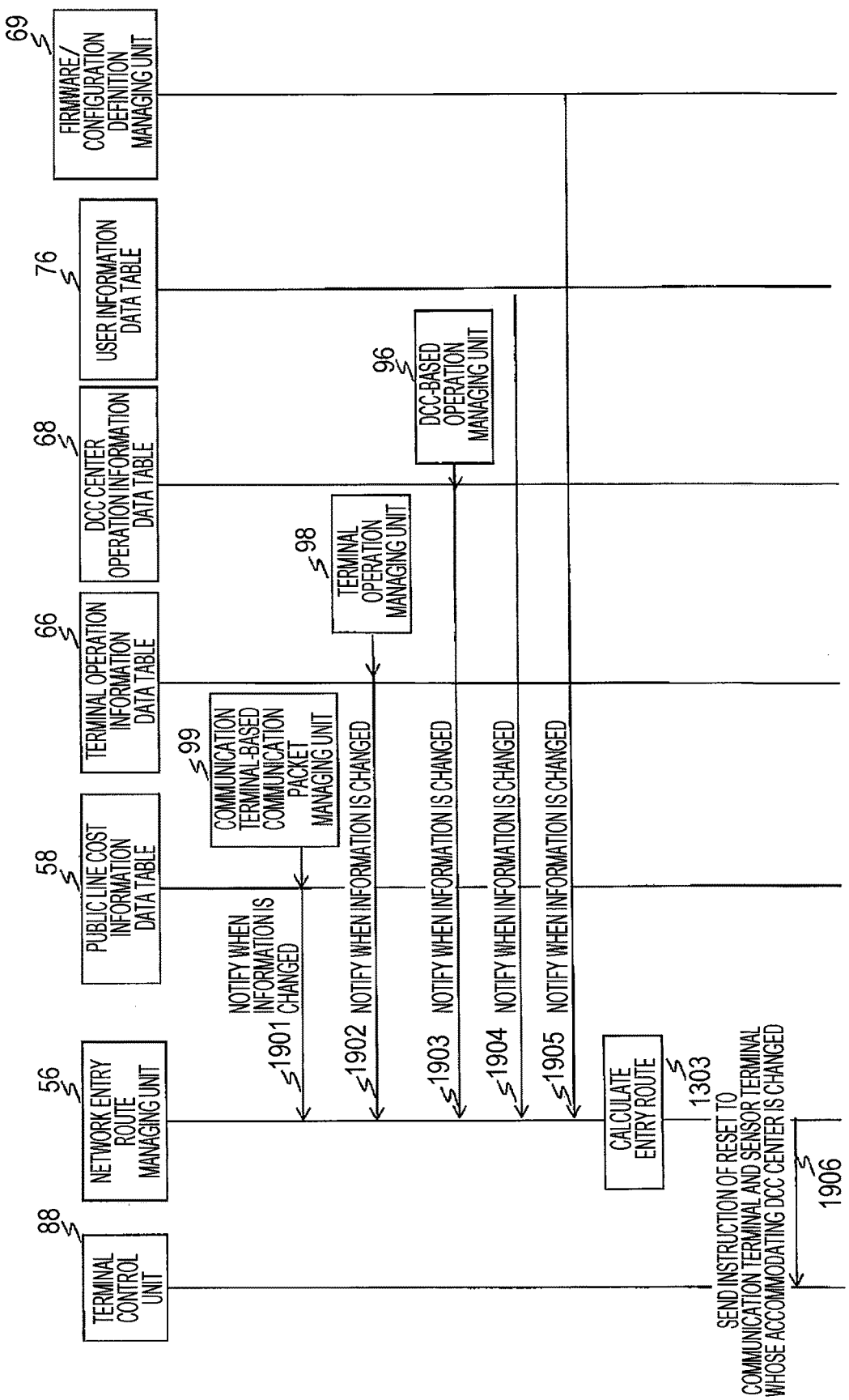
FIG. 19 is a sequence diagram for describing an operation of recalculation of a route in the embodiment of the invention.

FIG. 19 is a sequence diagram for describing an operation of recalculation of a route in the embodiment of the invention.

The recalculation of a route is carried out when information which is necessary to calculate a network entering route is changed. There are a plurality of information sets which are necessary to calculate the entering route, threshold values of the information sets are set so that it is possible to determine whether recalculation of the route should be carried out if which information is changed in which degree. According to this, it is possible to control frequency of recalculation of the route.

As shown in S1901 to S1905 in FIG. 19, threshold values of change amounts of the information sets are set, and if change exceeding the threshold value is made, the network entering route managing unit 56 is informed of this change, and the network entering route managing unit 56 carries out the recalculation of the entering route. As a result of recalculation of the route, a reset command or the like makes communication terminals or a sensor terminals change the destination DCC center which they connect. According to this, the communication terminal or the sensor terminal is made to again connect to the INIT center, the INIT center notifies a new communication path and information of the destination DCC center, and the communication path and the destination DCC center can be changed.

As conditions for carrying out the recalculation of an entering route, the maintenance information 686 of DCC center operation information table in FIG. 8 is also included. An entering route is calculated before system maintenance of the DCC center is carried out, it is determined that the accommodation destination is changed, command by reset is executed for all of communication terminals and sensor terminals which are being connected to DCC centers which are to be subjected to maintenance. According to this, the DCC center can be switched to another DCC center, and it is possible to prevent the communication from being disconnected by the maintenance. The recalculation of the entering route is carried out when the maintenance is carried out, and is a function which is utilized when the data collection cycle is changed or when the latest firmware/configuration definition is renewed.

A portion or all of the configurations of the calculator and the like, the processing unit and processing means described in the above embodiment may be realized by dedicated hardware.

The various kinds of software sets shown in the embodiment can be stored in various kinds of electromagnetic, electronic and optical storage media (e.g., non-temporary storage medium), and can be downloaded into a computer through communication network such as the Internet.

The present invention is not limited to the above-described embodiment, and various modifications are included in the invention. The embodiment is described in detail for describing the invention so that the invention can easily be understood, and the invention is not necessarily limited to one having all of the above-described configurations.

Kinds of the communication network provided by the communication carriers (103-a to 103-b) are not limited to mobile line, ISDN, optical line such as 3G-LTE (3GPP Long Term Evolution), WiMAX (Worldwide Interoperability for Microwave Access).

The wireless section 105 is composed of close range wireless communication function. Close range wireless communication employing WiFi (Wireless Fidelity), WiFi Direct or IP (Internet Protocol) such as Bluetooth (registered trade name), or close range wireless communication which can communicate through non-IP such as Zigbee (registered trade name) are commonly employed as the wireless section 105.

What is claimed is:

1. A communication terminal connection control method for connecting a communication terminal to a system having a plurality of servers via any of a plurality of communication networks, wherein
the plurality of servers include a terminal authenticating server for initially connecting with the communication terminal, a plurality of data collecting servers for collecting sensor information from a plurality of sensor terminals, and a managing server for connecting with the terminal authenticating server and the plurality of data collecting servers,
wherein destination information corresponding to the terminal authenticating server is previously stored in the communication terminal, the method comprising:
when the communication terminal sends a connection request for connection to the system, sending, by the communication terminal, the connection request to the terminal authenticating server based on the destination information corresponding to the terminal authenticating server, and sending terminal information including location information of the communication terminal to the terminal authenticating server;
managing, by the managing server, operation information of the plurality of data collecting servers indicating present status information of the plurality of data collecting servers;
managing, by the managing server, the location information of the communication terminal;
selecting, by the managing server, a destination data collecting server, of the plurality of data collecting servers, for the communication terminal which sent the connection request to the terminal authenticating server that is in communication with the managing server based on the operation information of the plurality of data collecting servers, the location information of the communication terminal, and a predetermined priority of the information of the operation information of the plurality of data collecting servers and the location information of the communication terminal;
selecting, by the managing server, a communication path for the selected data collecting server from the plurality of communication networks based on the operation information of the plurality of data collecting servers, the location information of the communication terminal, and a predetermined priority of the information of the operation information of the plurality of data collecting servers and the location information of the communication terminal; and
sending, by the managing server, destination information corresponding to the selected data collecting server and the selected communication path, to the communication terminal which sent the connection request via the terminal authenticating server.

2. The communication terminal connection control method according to claim 1,
a sensor terminal having an information collecting unit sends collected sensor information to the communication terminal,
wherein the communication terminal has a communicating unit that sends the sensor information received from the sensor terminal to the selected data collecting server via any of a plurality of communication networks.

3. The communication terminal connection control method according to claim 2, wherein
when predetermined information received from the data collecting server exceeds a predetermined threshold value, the managing server reselects the data collecting server to be connected with the communication terminal and reselects the communication terminal to be connected with the sensor terminal, and
the managing server controls the communication terminal or the sensor terminal to send the connection request to the terminal authenticating server when it is determined that it is necessary to change a destination from the data collecting server currently connected with the communication terminal to another data collecting server or from the communication terminal currently connected with the sensor server to another communication terminal as a result of the reselection.

4. The communication terminal connection control method according to claim 2, wherein
the communication terminal connects with the sensor terminal via a wireless communication,
sends the connection request based on the destination information corresponding to the terminal authenticating server which is stored in a non-volatile memory previously when the communication terminal connects to the system via the communication network,
stores the destination information corresponding to the selected data collecting server and the selected communication path which are sent from the managing server via the terminal authenticating server in a volatile memory, connects with the data collecting server via the communication network based on the destination information corresponding to the selected data collecting server and the selected communication path which are stored in the volatile memory, and sends the sensor information received from the sensor terminal to the data collecting server.

5. An information collecting system, comprising:

a system having a plurality of servers, a sensor terminal having an information collecting unit to collect sensor information and a communication terminal which sends the collected sensor information received from the sensor terminal to the system connected with the communication terminal via any of a plurality of communication networks, wherein the system comprises:

a terminal authenticating server for initial connection, a plurality of data collecting servers for collecting sensor information from a plurality of sensor terminals, and a managing server for connecting with the terminal authenticating server and the plurality of data collecting servers, wherein the managing server comprises:

a memory storing operation information of the plurality of data collecting servers indicating present status information of the plurality of data collecting servers and the location information of the communication terminal, a processor programmed to select both a destination data collecting server, of the plurality of data collecting servers, for the communication terminal sending a connection request to the terminal authenticating server communicating with the managing server and select a communication path for the selected collecting server from the plurality of communication networks, based the operation information of the plurality of data collecting servers, the location information of the communication terminal, and a predetermined priority of the information of the operation information of the plurality of data collecting servers and the location information of the communication terminal, a communication unit configured to send the destination information corresponding to the selected data collecting server and the selected communication path, to the communication terminal sending the connection request, wherein the communication terminal comprises:

a communication unit communicating with any of a plurality of communication networks, a non-volatile memory configured to have previously stored thereon destination information corresponding to the terminal authenticating server, a processor programmed to send the connection request to the terminal authenticating server based on the destination information corresponding to the terminal authenticating server which is stored in the non-volatile memory, and send a terminal information including location information of the communication terminal to the terminal authenticating server, a volatile memory configured to store the destination information corresponding to the selected data collecting server and the selected communication path which are selected by the managing server and sent via the terminal authenticating server.

6. The information collecting system according to claim 5, wherein when predetermined information received from the data collecting server exceeds a predetermined threshold value, the managing server reselects the data collecting server to be connected with the communication terminal and reselects the communication terminal to be connected with the sensor terminal, and the managing server controls the communication terminal or the sensor terminal to send the connection request to the terminal authenticating server when it is determined that it is necessary to change a destination from the data collecting server currently connected with the communication terminal to another communication terminal as a result of the reselection.

7. The information collecting system according to claim 5, wherein the communication terminal connects with the sensor terminal via a wireless communication, sends the connection request based on the destination information corresponding to the terminal authenticating server which is stored in a non-volatile memory previously when the communication terminal connects to the system via the communication network, stores the destination information corresponding to the selected data collecting server and the selected communication path which are sent from the managing server via the terminal authenticating server in a volatile memory, connects with the data collecting server via the communication network based on the destination information corresponding to the selected data collecting server and the selected communication path which are stored in the volatile memory, and sends the sensor information received from the sensor terminal to the data collecting server.

* * * * *